(12) United States Patent
Bögert et al.

(10) Patent No.: US 6,601,410 B1
(45) Date of Patent: Aug. 5, 2003

(54) DEVICE AND METHOD OF TRANSFERRING GLASS OBJECTS

(75) Inventors: Hermann Bögert, Auetal (DE); Raimund Malek, Auetal (DE)

(73) Assignee: Hermann Heye, Obernkirchen (DE)

( * ) Notice: Subject to any disclaimer, the term of this patent is extended or adjusted under 35 U.S.C. 154(b) by 365 days.

(21) Appl. No.: 09/718,581

(22) Filed: Nov. 22, 2000

(30) Foreign Application Priority Data

Nov. 26, 1999 (DE) .......................... 199 57 079

(51) Int. Cl.⁷ ............................ C03B 9/04; C03B 9/44
(52) U.S. Cl. ..................... 65/260; 65/227; 198/468.01; 198/493; 198/740
(58) Field of Search ............. 65/227, 260; 198/468.01, 198/493, 740

(56) References Cited

U.S. PATENT DOCUMENTS

| | | | |
|---|---|---|---|
| 3,249,200 A | 5/1966 | Rowe | 198/24 |
| 3,249,201 A | 5/1966 | Rydlewicz | 198/24 |
| 3,398,823 A | 8/1968 | Hollenton | 198/22 |
| 3,400,802 A | 9/1968 | Rowe | 198/24 |
| 3,559,537 A | 2/1971 | Faure | 91/462 |
| 3,595,365 A | 7/1971 | Faure | 198/24 |
| 4,162,911 A | 7/1979 | Mallory | 65/229 |
| 4,203,752 A | 5/1980 | Becker et al. | 65/163 |
| 4,222,480 A | 9/1980 | Perry | 198/490 |
| 4,340,413 A | 7/1982 | Rowland | 65/375 |

(List continued on next page.)

FOREIGN PATENT DOCUMENTS

| | | | | |
|---|---|---|---|---|
| DE | 27 46 675 C2 | 10/1977 | ........... | B65G/47/82 |
| DE | 19531053 A1 | 2/1996 | ........... | C03B/9/453 |
| DE | 69205793 T2 | 6/1996 | ........... | F15B/15/28 |
| DE | 19800080 C1 | 1/1998 | ........... | C03B/9/453 |
| DE | 299 02 149 U1 | 9/1999 | ........... | B65G/47/74 |
| EP | 0 416 779 | 3/1991 | ........... | C03B/9/453 |
| EP | 0 536926 B1 | 11/1995 | ........... | F15B/15/28 |
| WO | WO 97/26220 | 7/1997 | ........... | C03B/9/453 |

OTHER PUBLICATIONS

Perry, Robert, Perry's Chemical Engineers'Handbook, 6th Ed. pp. 6–57 to 6–62.*
U.S. Appln. No. 09/447,667, filed Nov. 23, 1999, entitled Apparatus for Pushing Hollow Glass Articles onto A Conveyor Belt (Malek).

*Primary Examiner*—Michael Colaianni
(74) *Attorney, Agent, or Firm*—Synnestvedt & Lechner LLP

(57) ABSTRACT

The device (1) comprises a transfer mechanism (7) which is attached to the free ends of two parallel piston rods (13, 14). The associated piston-cylinder units (15, 16) are attached to a support structure (17) and can be pivoted therewith in a reciprocating manner about a vertical axis (18) by an angle of approximately 105° between a dead plate (3) and a conveyor belt (5). Compressed air nozzles (11) for the purpose of producing negative pressure in corners (10) of the transfer mechanism (7) are supplied with compressed air from a first advance chamber (22) by way of a supply duct (12) of the transfer mechanism (7) and one (13) of the piston rods and the associated piston (21). This is performed by way of a first directional control valve (29) from a first compressed air source (31) of relatively low pressure. The transfer mechanism (7) is advanced by virtue of the piston-cylinder unit (16) by way of a second directional control valve (40) from a second compressed air source (42) of relatively high pressure. The transfer mechanism (7) is retracted by influencing retraction chambers (35, 43) with compressed air which is taken from the second compressed air source (42) by way of a third directional control valve (46).

21 Claims, 6 Drawing Sheets

U.S. PATENT DOCUMENTS

| | | |
|---|---|---|
| 4,462,519 A | 7/1984 | Parkell et al. .............. 198/490 |
| 4,466,532 A | 8/1984 | Minneman et al. ......... 198/490 |
| 4,502,721 A | 3/1985 | Savin-Czeizler et al. .... 294/1.1 |
| 4,528,018 A | 7/1985 | Schneider et al. ............ 65/260 |
| 4,771,878 A | 9/1988 | Braithwaite et al. ... 198/468.01 |
| 4,927,444 A | 5/1990 | Voisine ........................ 65/323 |
| 5,037,466 A | 8/1991 | Voisine et al. ................ 65/260 |
| 5,056,648 A | 10/1991 | Huber et al. ........... 198/468.01 |
| 5,061,309 A | 10/1991 | Mungovan et al. ........... 65/260 |
| 5,125,499 A | 6/1992 | Saathoff et al. ........ 198/468.01 |
| 5,181,949 A | 1/1993 | Egloff ......................... 65/375 |
| 5,429,651 A | 7/1995 | Bolin .......................... 65/241 |
| 5,527,372 A | 6/1996 | Voisine et al. ................ 65/260 |
| 5,733,354 A | 3/1998 | Voisine et al. ................ 65/260 |
| 5,988,355 A | 11/1999 | Merour ...................... 198/493 |
| 6,062,845 A | 5/2000 | Conaway et al. ........... 425/444 |
| 6,349,571 B1 * | 2/2002 | Gorski et al. |
| 6,494,063 B1 * | 12/2002 | Malek |

* cited by examiner

DEVICE AND METHOD OF TRANSFERRING GLASS OBJECTS

The invention relates to a device according to the preamble of claim 1 or 3 and to a method of operating a device of this type.

In the case of a known device of this type (DE 299 02 149 U1) it is disclosed that the longitudinal duct is formed in the free end of the first piston rod. The air net which is connected to the longitudinal duct is not significant therein.

It is known per se from U.S. Pat. No. 4,927,444 A to attach the transfer mechanism to the piston rod of only one single pneumatic piston-cylinder unit. The longitudinal duct passes through the entire piston rod and the piston and issues into an advance chamber of the piston-cylinder unit. As shown in FIG. 1, the advance chamber can be selectively connected via a directional control valve to a first compressed air source of relatively low pressure or to a second compressed air source of relatively high pressure for the purpose of supplying the nozzles with blowing air. The disadvantage is that although in the case of the connection of the advance chamber to the first compressed air source the transfer mechanism is advanced slowly, but compressed air is also lost at the nozzles without being utilized. A further disadvantage is that when the directional control valve is in the other position the process of blowing air from the nozzles on to the glass containers is performed with substantial expenditure at the high compressed air pressure.

A piston-cylinder unit for linearly driving a pressing plunger of a press-and-blow glass forming machine, fixed to the piston rod, is known per se from DE 692 05 793 T2. The piston and the piston rod have an axial through bore for conducting cooling air to the pressing plunger. The free end of a cooling air pipe is sealingly extending into the through bore. The outer end of the cooling air pipe is attached to an end cap of the cylinder and is supplied with cooling air from a channel formed in said end cap.

It is known per se from U.S. Pat. No. 4,462,519 A to blow compressed air on to glass containers, which are placed on the dead plate in a row, by virtue of machine-fixed feeder nozzles such that each glass container is pushed into a corner of the transfer mechanism before it begins to pivot. The corners are oriented differently and can be advanced and then retracted independently of each other. Similar feeder nozzles are known per se from DE 198 00 080 C1.

It is known per se from U.S. Pat. No. 4,340,413 A, for the purpose of advancing and retracting the transfer mechanism to use two mutually parallel piston-cylinder units, whose piston rods are attached to the transfer mechanism.

DE 27 46 675 C2 illustrates details of the pivot drive and the pressure medium guidance and control for the purpose of advancing and retracting the transfer mechanism.

It is the object of the invention to improve the air conduction in the device and to reduce the consumption of compressed air.

This object is initially achieved by the device in accordance with claim 1. The dead plate is preferably perforated and cooling air can be controlled from below to pass through said dead plate. The second piston-cylinder unit only serves to advance the transfer mechanism to its outer end position. In contrast, the first piston-cylinder unit only serves to supply the nozzles with blowing air. In this manner, the blowing air in particular can only issue out of the nozzles in a precisely controlled manner, if this is required for the purpose of fixing the glass objects in the corners of the transfer mechanism during the pivoting transfer process. These features lead to a noticeable reduction in compressed air. A further advantage is that no disruptive blowing air is located in the corners as long as the glass objects are introduced into the corners.

By virtue of the features of claim 2, it is possible to retract the transfer mechanism in a rapid manner if the transfer mechanism has transferred the glass objects to the conveyor belt. Since the conveyor belt continues to run at a constant speed, it is necessary to obviate collisions of the pushing fingers with the transferred glass objects. The features of claim 2 serve this purpose.

The previously mentioned object is also achieved by virtue of the features of claim 3. The telescopic pipe represents a cost-effective way of supplying the nozzles with blowing air. The telescopic pipe can be accessed from the outside and can be monitored in this manner conveniently and can be maintained and replaced as required.

In accordance with claim 4, the transfer mechanism can be advanced to its outer end position in an advantageous, relatively slow manner. As a consequence, in the same manner as in claim 1 the transfer mechanism is not advanced too rapidly to its outer end position. As the transfer mechanism is being advanced, this prevents it from colliding with the glass objects which are to be transferred at a later stage. Whilst being advanced, the glass objects can still be suspended on a takeout device which transports the glass objects from the glassware forming machine on to the dead plate. During this procedure, any contact between the transfer mechanism and glass objects to be set down is to be obviated.

In turn, the features of claim 5 cause the transfer mechanism to be retracted to its inner starting position in an undesirably rapid manner.

The features of claim 6 are particularly advantageous in a structural sense.

In accordance with claim 7, an adjustable and precise path limitation is provided in a convenient manner for the transfer mechanism.

In accordance with claim 8, feeder nozzles are used if the glass containers which are set down on the dead plate are still disposed too far from the corners of the transfer mechanism located in its outer end position. In this case, the glass objects can be initially moved by the feeder nozzles into the corners, before the nozzles of the corners take on the function of fixing the glass objects in the corners. The fourth directional control valve can be formed as a 2 port/2 position valve.

In accordance with claim 9, the glass objects are set in rotational movement by virtue of the feeder nozzles and are introduced in a particularly protective and careful manner into the corners. The glass containers are prevented from being drawn by air in an undesirable manner in the direction of the feeder nozzles.

The features of claim 10 enable the supply of compressed air to the individual consumers to be adjusted in a sensitive manner such that the operation is performed in an optimum manner.

The previously mentioned object is also achieved by virtue of the method features of claim 11. This also serves noticeably to reduce the quantity of compressed air. As the glass objects are being introduced into the corners, there is no disruptive blowing air at this site. The first directional control valve can be formed e.g. as a 2 port/2 position valve. The first directional control valve can supply compressed air to the nozzles shortly before the transfer mechanism begins to pivot. This ensures that the glass objects are held in each case in a reliable manner in their corners of the transfer mechanism.

In accordance with claim 12, the glass objects can initially be moved into the corners by the action of the feeder nozzles, before the nozzles at this site serve to fix the glass objects in the corners.

BRIEF DESCRIPTION OF DRAWING

These and further features and advantages of the invention will be explained in detail hereinunder with reference to the exemplified embodiments illustrated in the drawings, in which

FIG. 1 illustrates a device 1 for the purpose of transferring three hollow glass objects 2 from a dead plate 3 of a glassware forming machine [not illustrated in detail] along a curved path 4 on to a conveyor belt 5. The conveyor belt 5 moves at a constant speed in the direction of an arrow 6. The glassware forming machine can be, for example, a section of an I.S. (individual section) glassware forming machine.

Figure 1:
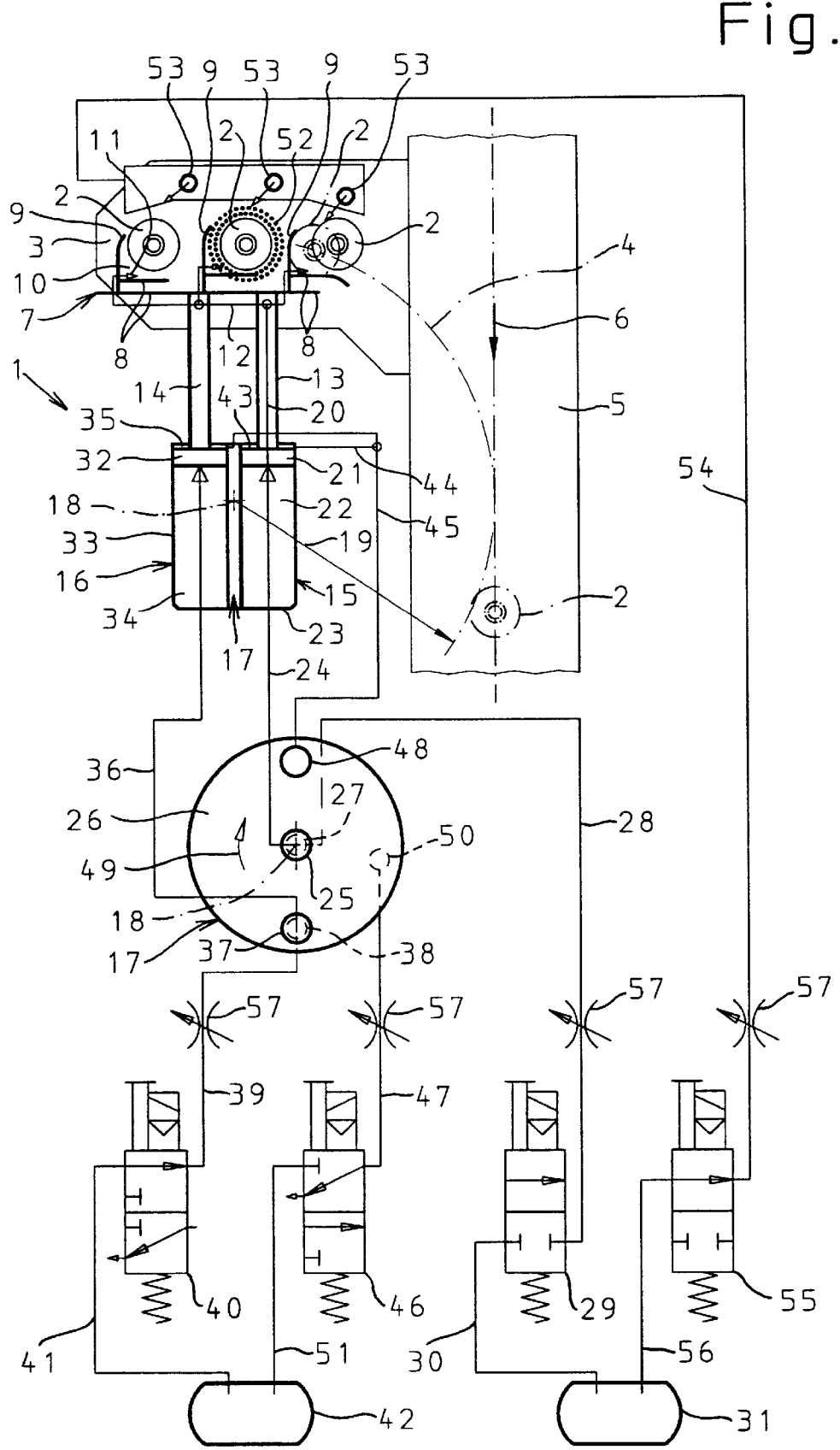
FIG. 1 shows a schematic illustration of a first embodiment of the device in one operating position.

The device 1 comprises a transfer mechanism 7 which is only illustrated schematically in FIG. 1 and has a base part 8 and said device comprises for each glass object 2 to be transferred a pushing finger 9 which extends in a transverse manner from the base part 8. Each pushing finger 9 defines with the base part 8 a corner 10 for receiving the associated glass object 2. The transfer mechanism 7 comprises for each corner 10 at least one nozzle 11. Compressed air can be blown out of each nozzle 11 in such a manner that negative pressure which draws the glass object 2 into the corners 10 is produced between the transfer mechanism 7 and the glass object 2. Each nozzle 11 can be influenced with compressed air by way of a supply duct 12 which is provided in the transfer mechanism 7. The transfer mechanism 7 is attached to free ends of two mutually parallel piston rods 13 and 14, which are arranged in a horizontal plane, of pneumatic piston-cylinder units 15 and 16.

Figure 2:
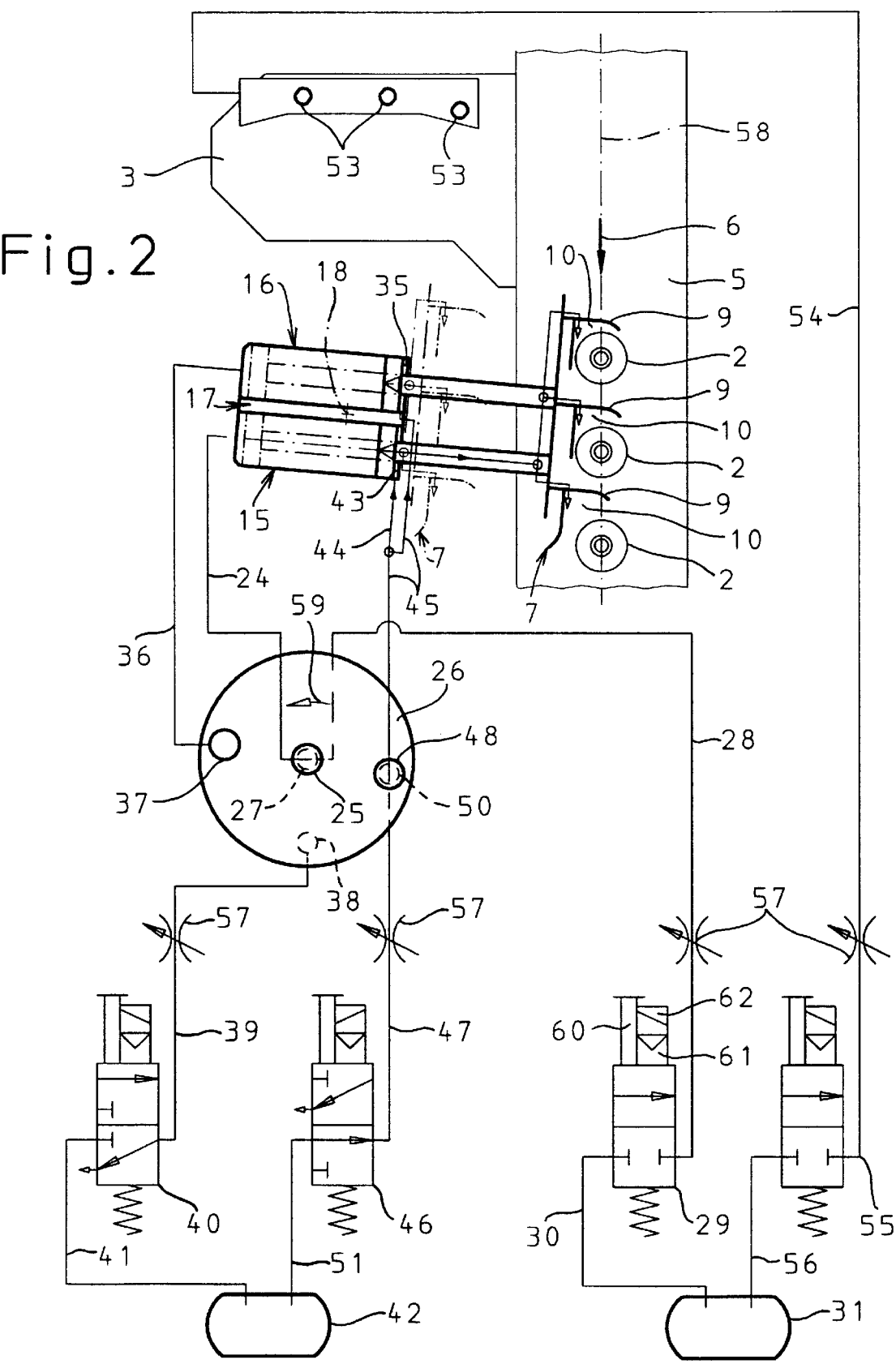
FIG. 2 shows the device as shown in FIG. 1 in a different operating position.

In the case of FIG. 1, the transfer mechanism 7 can be advanced by the piston-cylinder unit 15 into an outer end position which is illustrated in FIGS. 1 and 2 by the unbroken lines, and said transfer mechanism can be retracted to an inner starting position which is illustrated in FIG. 2 by dot-dash lines. The piston-cylinder units 15, 16 are fixed in a relative manner to each other by way of a support structure 17 and can be pivoted in a reciprocating manner about a vertical axis 18 by an angle of approximately 105° between a take-up position on the dead plate 3 as illustrated in FIG. 2, and a transfer position on the conveyor belt 5 as illustrated in FIG. 2 by the unbroken lines. In the present case, this pivot movement occurs on the curved path 4, which is formed as an arc of a circle, with a radius 19.

The supply duct 12 is connected to a longitudinal duct 20 which passes through the entire first piston rod 13 and an associated first piston 21 of the first piston-cylinder unit 15 and issues into a first advance chamber 22 of an associated first cylinder 23. The first advance chamber 22 is connected by way of a line 24, a central bore 25 in a cam plate 26, which forms a component of the support structure 17, a duct 27, which is coaxial with the bore 25, in the stationary part of the device 1, and a line 28 to a first directional control valve 29 which is formed as a 2 port/2 position valve. The first directional control valve 29 is connected by way of a line 30 to a first compressed air source 31 of relatively low pressure of e.g. a maximum of 2.5 bar.

The second piston-cylinder unit 16 comprises the second piston rod 14, a second piston 32 and in a second cylinder 33 a second advance chamber 34 and a second retraction chamber 35. The second advance chamber 34 is connected by way of a line 36, a bore 37 on the periphery of the cam plate 26, a duct 38 in the stationary part of the device 1 and a line 39 to a second directional control valve 40 which is formed as a 3 port/2 position valve. For its part, the second directional control valve 40 is connected by way of a line 41 to a second compressed air source 42 of relatively high pressure of e.g. a maximum of 6 bar.

A first retraction chamber 43 in the first cylinder 23 and the second retraction chamber 35 are connected by way of lines 44 and 45 to a bore 48 on the periphery of the cam plate 26. By pivoting the support structure 17 and thus the cam plate 26 in a clockwise direction as shown by the arrow 49, the bore 48 can overlap with a duct 50 in the stationary part of the device 1. The duct 50 is connected by way of a line 47 to a third directional control valve 46 which is formed as a 3 port/2 position valve. For its part, the third directional control valve 46 is connected by way of a line 51 to the second compressed air source 42.

The dead plate 3 is provided in the transfer region of each glass object 2 with openings 52 which are distributed on a circular surface. For simplification, the openings 52 are only illustrated for one glass object 2. During a specific part of the operating cycle (cf. functional graph (C) in FIG. 4) cooling air can be blown through the openings for the purpose of cooling the glass objects 2 which have been set down on the dead plate 3.

The glass objects 2 are originally removed from the glassware forming machine by virtue of a takeout device [not illustrated further] and are set down in a straight line on the dead plate 3. This state is illustrated by the unbroken lines of the glass objects 2 in FIG. 1. Then, the second directional control valve 40 is switched through to the switching position illustrated in FIG. 1, wherein compressed air passes from the second compressed air source 42 into the second advance chamber 34 by way of the line 41, the second directional control valve 40, the line 39, the duct 38, the bore 37 and the line 36. As a consequence, the second piston 32, the second piston rod 14 and, entrained by the transfer mechanism 7, also the first piston 21 and the first piston rod 13 are advanced to the outer end position illustrated in FIG. 1. In this position, the glass objects 2 are still located at a relatively large spaced interval from the associated corners 10. This large spacing means that the nozzles 11 are not yet able to perform their function of drawing the glass objects 2 by suction into the corners 10. Therefore, feeder nozzles 53 are disposed fixed to the machine adjacent to the glass objects 2 which have been set down on the dead plate 3. Each feeder nozzle 53 is originally directed in a tangential manner to a side of the glass object 2 facing the associated pushing finger 9, as indicated in FIG. 1. The compressed air jets emanating from the feeder nozzles 53 cause the glass objects 2 to rotate about their longitudinal axis and convey the glass objects 2 into the corners 10, as indicated in FIG. 1 for the glass object on the right-hand side illustrated by dot-dash lines. In so doing, the glass objects 2 are prevented from being drawn by suction in the direction of the feeder nozzles 53. At the latest when the glass object 2 moves into position in its corner 10, the nozzles 11 are able to perform their suction action on the glass objects 2 and then also hold them in the corners 10, if subsequently the transfer mechanism 7 is pivoted in a clockwise direction along the curved path 4 over the conveyor belt 5. The feeder nozzles 53 are connected by way of a line 54 to a fourth directional control valve 55 which is formed as a 2 port/2 position valve. For its part, the fourth directional control valve 55 is connected by means of a line 56 to the first compressed air source 31.

Each of the lines 28, 39, 47 and 54 is provided with an adjustable restrictor valve 57 which can be used to adjust in a sensitive manner the pressure in the respective line.

As soon as the glass objects 2 in FIG. 1 have been moved by means of the feeder nozzles 53 to the corners 10, the directional control valve 29 will be switched through to a lower position. As a consequence, the nozzles 11 are supplied with compressed air by way of the lines 30, 28, the duct 27, the bore 25, the line 24, the first advance chamber 22, the longitudinal duct 20 and the supply duct 12 and in this manner also hold the glass objects 2 in the corners 10 as the transfer mechanism 7 pivots over from its take-up position in FIG. 1 to its transfer position as shown in FIG. 2 above the conveyor belt 5. The pivot drive of the cam plate 26 required for this purpose together with the support structure 17 can be performed e.g. by the drive disclosed in the previously mentioned DE 27 46 675 C2.

When the transfer mechanism 7 is in the transfer position as shown in FIG. 2, the glass objects 2 have been transferred ideally on to the middle line 58 of the conveyor belt 5. As shown in the illustration of FIG. 2, the glass objects 2 have become somewhat removed from the corners 10 of the transfer mechanism 7 owing to the continuous movement of the conveyor belt 5. At this moment, the directional control valve 46 as shown in FIG. 2 is switched through to the lower switching position. As a consequence, compressed air passes from the second compressed air source 42 by way of the lines 51 and 47 into the duct 50 and through the bore 48, which is now aligned therewith, of the cam plate 26 and the lines 45, 44 into the retraction chambers 35, 43. As a result, the transfer mechanism 7 is retracted so rapidly to its inner starting position (illustrated by dot-dash lines in FIG. 2) that none of the pushing fingers 9 collides with the glass objects 2 which have been transferred on to the conveyor belt 5. Then, the support structure 17 can be pivoted back with the cam plate 26 in an anti-clockwise direction as shown by the arrow 59, until the piston-cylinder units 15, 16 have reached their take-up position once again, as shown in FIG. 1.

The chronological sequence of all necessary control and movement functions will be explained in detail in conjunction with FIG. 4. All directional control valves 29, 40, 46 and 55 can be actuated in the same manner. It can be appreciated in the example of the directional control valve 29 that the actuation can be performed on the one hand by means of a manual switch 60 or the actuation can be remote-controlled by compressed air 61 or electromagnetically 62. Therefore, in addition to the rough control function by means of the cam plate and its bores 37 and 48, it is possible to control the compressed air in a sensitive manner by virtue of the directional control valves 40, 46. In contrast, the blowing air for the nozzles 11 (FIG. 1) is merely controlled by actuating the directional control valve 29 without a control function of the cam plate 26. The same applies to supplying the feeder nozzles 53 with compressed air by way of the directional control valve 55.

Figure 3:
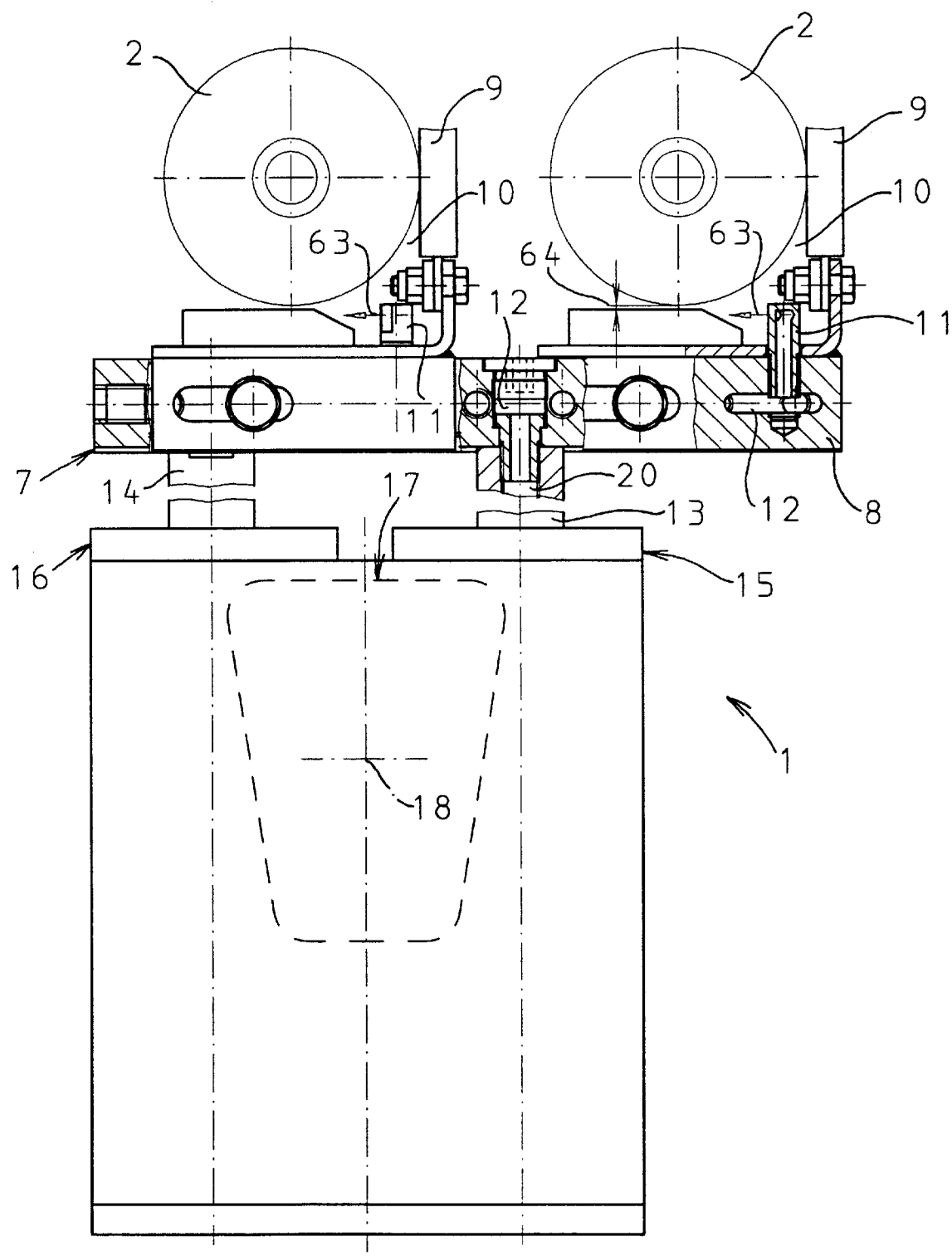
FIG. 3 shows a partially cut plan view of a different embodiment of the device.

FIG. 3 illustrates a different embodiment of the device 1. In contrast to FIGS. 1 and 2, only two glass objects 2 are simultaneously transferred in this case from the dead plate on to the conveyor belt. A further difference is that this transfer of glass objects occurs by pivoting the support structure 17 anti-clockwise together with the piston-cylinder units 15, 16 and the transfer mechanism 7, as shown in FIG. 3. Further details of this embodiment, in particular with respect to the formation of the transfer mechanism 7, are evident in DE 299 02 149 U 1 mentioned in the introduction.

In the case of FIG. 3, the nozzles blow their compressed air jets 63 out of the corner point of each corner 10 parallel with the base part 8. The compressed air flows through a relatively narrow gap 64 between the base part 8 and the glass object 2, whereas the glass object 2 lies in a defined manner against its pushing finger 9.

Figure 4:
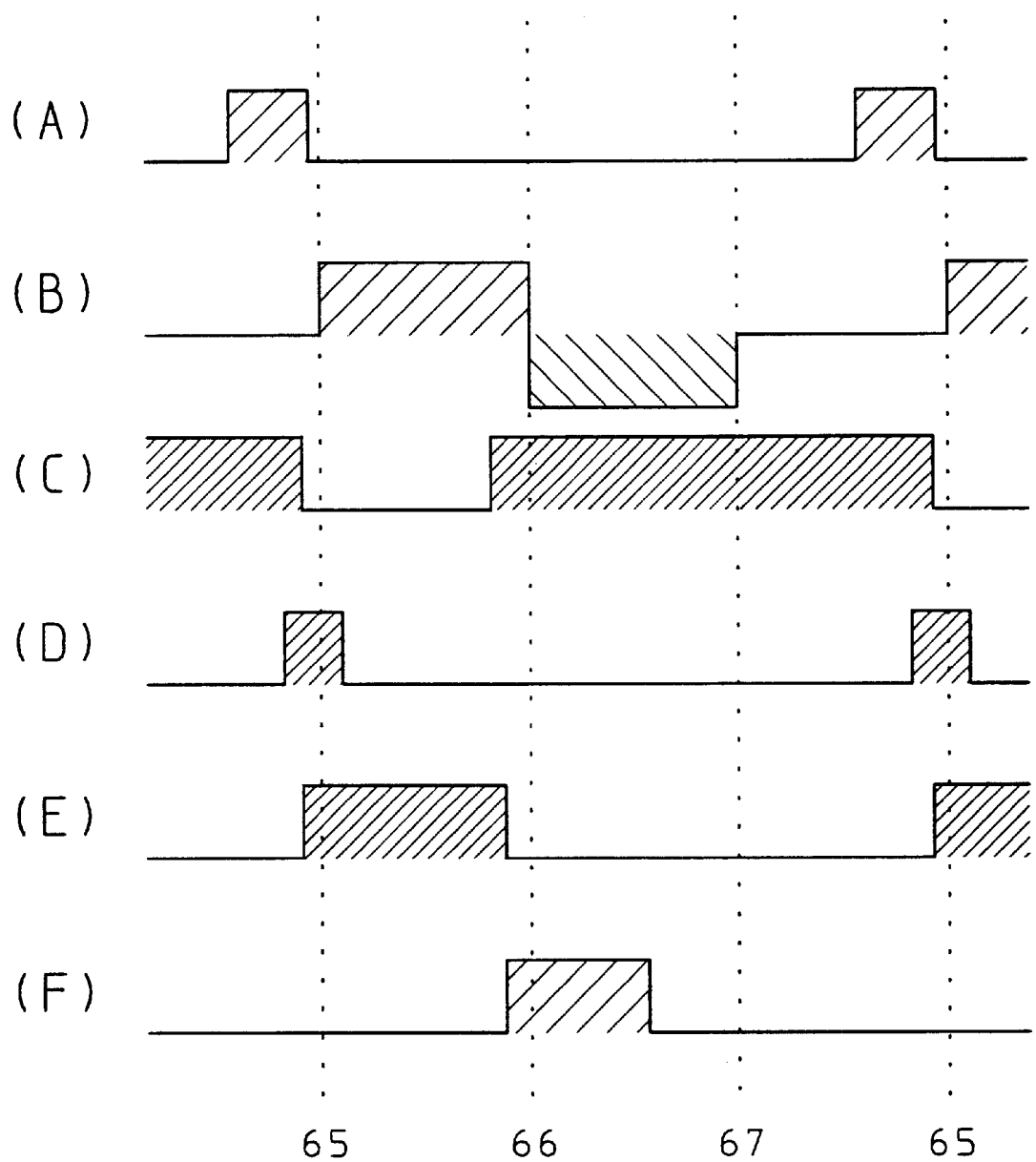
FIG. 4 shows functional graphs (A) to (F) for one operating cycle of the device.

The functional graphs as shown in FIG. 4 represent the following:

(A)=advance movement of the transfer mechanism 7
(B)=reciprocating pivot movement of the transfer mechanism 7,
(C)=cooling air supply to the openings 52 of the dead plate 3,
(D)=blowing air supply to the feeder nozzles 53,
(E)=blowing air supply to the nozzles 11 and
(F)=retraction movement of the transfer mechanism 7.

The vertical dotted lines in FIG. 4 denote particular points in time within the functional graphs (A) to (F) and represent the following:

65=start the forwards pivot movement,
66=stop the forwards pivot movement and start the return pivot movement and
67=stop the return pivot movement of the transfer mechanism 7.

In the functional graphs (A) and (C) to (F) the shaded areas each represent compressed air switched on.

It is evident in functional graph (A) that the advance air from the directional control valve 40 is switched off shortly before time 65.

It is evident in functional graph (C) that the cooling air is switched off from shortly before time 65 until shortly before time 66, in order not to prevent the glass objects 2 from being transferred in an ordered manner.

Functional graph (D) shows that the blowing air supply to the feeder nozzles 53 is only maintained for as long as is necessary for moving the glass objects 2 far enough into the corners 10 as shown in FIG. 1.

Functional graph (E) illustrates that the blowing air supply to the nozzles expediently commences shortly before time 65. From this moment on, the nozzles serve to fix the glass objects 2, which have been supplied by the feeder nozzles, in the corners 10 and keep them fixed at this site until shortly before time 66, i.e. the transfer of the glass objects 2 on to the conveyor belt 5. In this case, the blowing air to the nozzles 11 is also switched off soon enough such that the glass objects 2 can be transferred to the conveyor belt 5 in an unhindered manner.

In accordance with functional graph (F), the retraction movement of the transfer mechanism 7 is initiated in an expedient manner shortly before time 66. The time at which this is initiated can be determined in an extremely precise manner by controlling the directional control valve 46 as shown in FIG. 2. The aim is to retract the transfer mechanism 7 rapidly and at the particular point in time such that during the retraction movement a pushing finger 9 does not contact the glass objects 2 which have been transferred on to the conveyor belt 5 which is still running.

In all of the Figures of the drawings, like parts are designated by like reference numerals.

Figure 5:
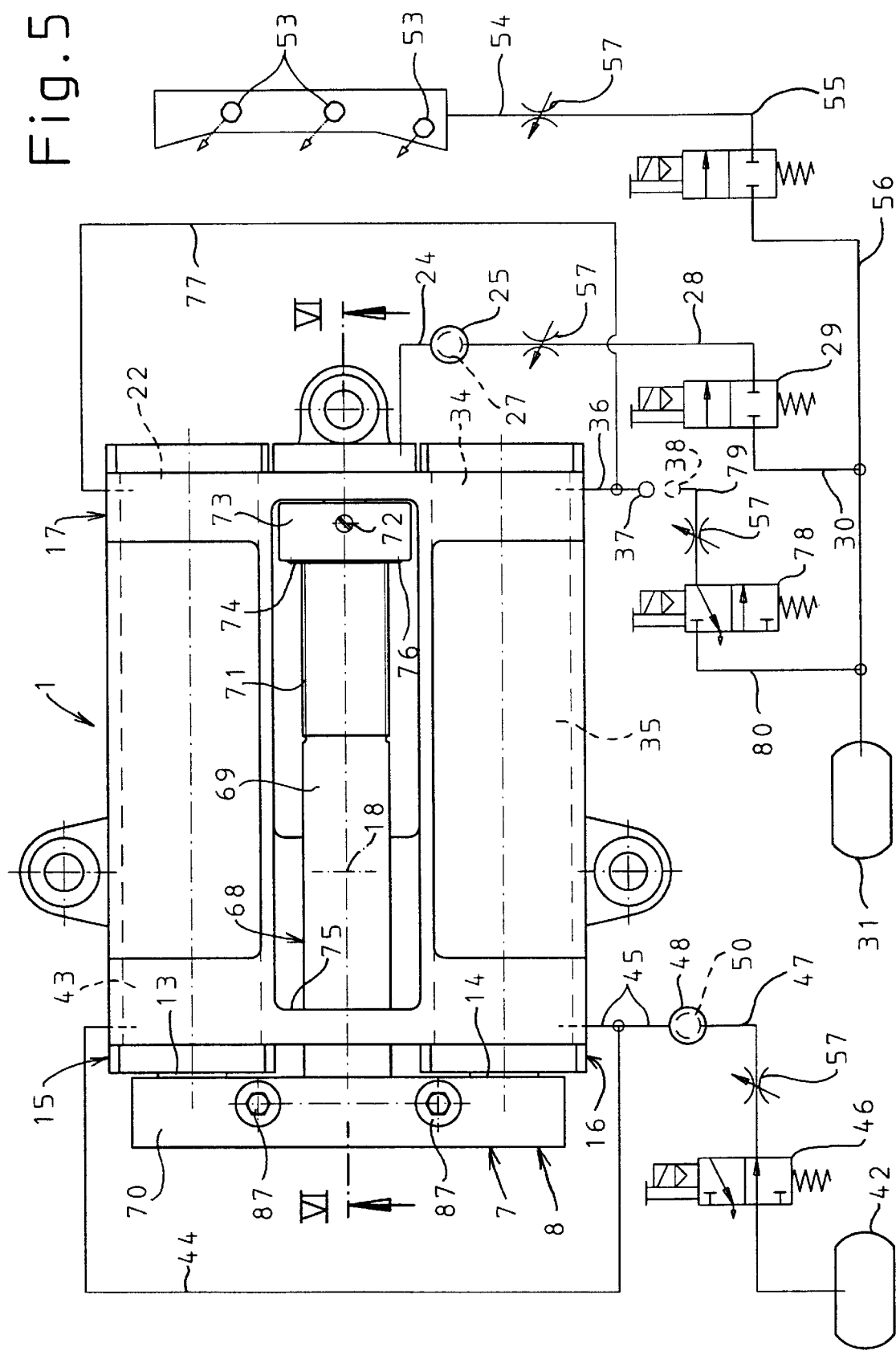
FIG. 5 shows the plan view of a part of a different embodiment of the device.
Figure 6:
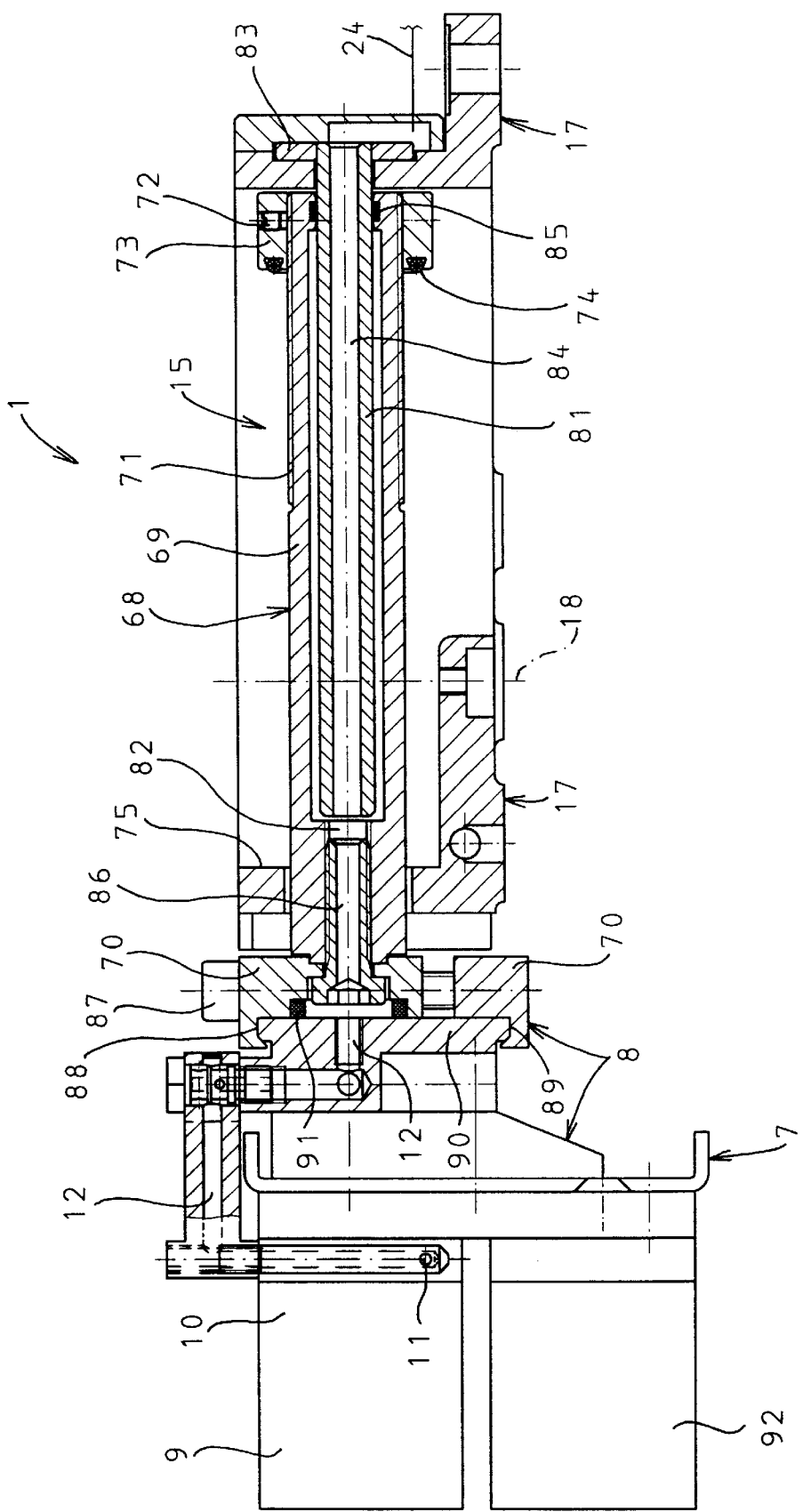
FIG. 6 shows essentially the sectional view according to line VI-VI in FIG. 5.

In the case of the exemplified embodiment according to FIGS. 5 and 6, the blowing air supply to the nozzles 11 does not take place by virtue of one of the piston-cylinder units 15,16, but rather by virtue of a separate telescopic pipe 68.

An external pipe 69 of the telescopic pipe 68 is attached in FIGS. 5 and 6 on the left-hand side to a clamping piece 70 of the transfer mechanism 7 in the same way as the free ends of the piston rods 13, 14. The free end of the external pipe 69 on the right-hand side of FIGS. 5 and 6 is provided with an external thread 71. A nut 73 which can be adjusted along the external pipe 69 and can be fixed by virtue of a headless screw 72 in any selected axial position is in engagement with the external thread 71. An end face 74 of the nut 73 facing the transfer mechanism 7 defines together with an opposite-lying stop surface 75 of the support structure 17 the outer end position of the transfer mechanism 7. For the purpose of reducing wear and for damping purposes, the end face 74 is formed in the exemplified embodiment by virtue of an O-ring 76 which is embedded in the nut 73 but protrudes in an axial manner out of the nut 73.

The pneumatic switching arrangement illustrated in FIG. 5 is constructed in a fundamentally similar manner to the pneumatic switching arrangement described with respect to FIGS. 1 and 2. However, in FIG. 5 both advance chambers 22, 34 are connected by way of a line 77 and the line 36 to the bore 37, illustrated only schematically in this case, of the cam plate 26 [not illustrated in detail] (FIGS. 1 and 2). A fifth directional control valve 78 which in this case is formed as a 3 port/2 position valve is connected on the one side by way of a line 79 to the duct 38 and is connected on the other side by way of a line 80 to the first compressed air source 31. In the case of this exemplified embodiment, both advance chambers 22, 34 are influenced with compressed air of relatively low pressure for the purpose of advancing the piston rods 13, 14 and thus the transfer mechanism 7. In this case, this advance movement can thus also be performed in a comparatively slow manner.

It is evident in FIG. 6 that an internal pipe 81 of the telescopic pipe 68 extends into the external pipe 69 and into an inner chamber 82 of the telescopic pipe 68. On the right-hand side, the internal pipe 81 is fixed to the support structure 17 by way of an outer flange 83. A hollow chamber 84 of the internal pipe 81 is constantly connected on one side to the line 24 and on the other side to the inner chamber 82. The external pipe 69 is sealed in a sliding manner with respect to the internal pipe 81 by virtue of an annular seal 85.

The end of the external pipe 69 on the left-hand side of FIG. 6 is attached by way of a hollow screw 86 to an upper element of the clamping piece 70. This upper element comprises two through-going bores, through which clamping screws 87 (see also FIG. 5) are inserted. The clamping screws 87 engage with their threaded end into a threaded bore of a lower element of the clamping piece 70. The two elements of the clamping piece 70 each comprise one longitudinal groove 88 and 89, in which a respective flange of a coupling piece 90 of the transfer mechanism 7 can be fixedly clamped. An annular seal 91 serves to seal the upper element of the clamping piece 70 with respect to the coupling piece 90. The supply duct 12 of the transfer mechanism 7 issues out of the coupling piece 90.

In the case of FIGS. 5 and 6, each corner 10 comprises an upper pushing finger 9 and a lower pushing finger 92. In the case of relatively short glass objects which are to be transferred, the upper pushing finger 9 can be dismantled. These aspects are described in detail in the previously mentioned DE 299 02 149 U1.

What is claimed is:

1. A transfer device for transferring at least one glass object along a curved path from a dead plate of a glassware forming machine to an associated conveyor belt, said transfer device comprising:

a transfer mechanism having a base part and at least one pushing finger extending transversely from said base part to define a corner for receiving the glass object, a nozzle being positioned at said corner capable of directing a compressed air stream between the glass object and said base part to create negative pressure drawing said glass object into said corner, a supply duct positioned on said transfer mechanism supplying compressed air to said nozzle;

first and second pneumatic piston-cylinder units having respective first and second piston rods extending therefrom, said piston rods being arranged mutually parallel to each other in a horizontal plane, each said piston rod having a free end attached to said transfer mechanism and an opposite end connected to respective first and second pistons within respective first and second cylinders of said piston-cylinder units, said piston-cylinder units being pivotally mounted for reciprocal rotational motion about a vertical axis to move said transfer mechanism between a take-up position on the dead plate, and a transfer position on the conveyor belt, said piston rods being linearly reciprocable to advance said transfer mechanism to an outer end position and retract said transfer mechanism to an inner starting position, said first and second cylinders defining respective first and second advance chambers therewithin, said first piston rod having a longitudinal duct connected to said supply duct on said transfer mechanism, said longitudinal duct extending through said first piston rod, through said first piston and into said first advance chamber;

a first compressed air source providing compressed air at relatively low pressure and a second compressed air source providing compressed air at a relatively higher pressure;

a first directional control valve for selectively connecting said first compressed air source to said first advance chamber;

a second directional control valve capable of selectively connecting said second advance chamber to one of said second compressed air source or the atmosphere.

2. A transfer device according to claim 1, further comprising:

a first retraction chamber positioned within said first cylinder and a second retraction chamber positioned within said second cylinder; and a third directional control valve capable of selectively connecting both said first and second retraction chambers to one of said second compressed air source or the atmosphere.

3. A transfer device for transferring at least one glass object along a curved path from a dead plate of a glassware forming machine to an associated conveyor belt, said transfer device comprising:

a transfer mechanism having a base part and at least one pushing finger extending transversely from said base part to define a corner for receiving the glass object, a nozzle being positioned at said corner capable of directing a compressed air stream between the glass object and said base part to create negative pressure drawing said glass object into said corner, a supply duct positioned on said transfer mechanism supplying compressed air to said nozzle;

first and second double action pneumatic piston-cylinder units having respective first and second piston rods extending therefrom, said piston rods being arranged mutually parallel to each other in a horizontal plane, each said piston rod having a free end attached to said transfer mechanism, said piston-cylinder units being mounted on a support structure which is pivotable for reciprocal rotational motion about a vertical axis to move said transfer mechanism between a take-up position on the dead plate, and a transfer position on the conveyor belt, said piston rods being linearly reciprocable to advance said transfer mechanism to an outer end position and retract said transfer mechanism to an inner starting position;

an elongated gas-tight telescopic pipe having one end attached in a sealed manner to said transfer mechanism and the other end attached in a sealed manner to said support structure, said gas-tight telescopic pipe having an inner chamber connected in fluid communication with said supply duct and an inlet in fluid communication with said inner chamber;

a first compressed air source providing compressed air at relatively low pressure; and a first directional control valve capable of selectively connecting said first compressed air source to said inlet of said gas-tight telescopic pipe for supplying said compressed air to said nozzle on said transfer mechanism.

4. A transfer device according to claim 3, wherein said first and second piston-cylinder units define respective first and second advance chambers therewithin, and said transfer device further comprises a second directional control valve capable of selectively connecting said first and second advance chambers to one of said first compressed air source or said atmosphere.

5. A transfer device according to claim 3, wherein said first and second piston-cylinder units define respective first and second retraction chambers therewithin, and said transfer device further comprises a second compressed air source of relatively higher pressure and a second directional control valve capable of selectively connecting said first and second retraction chambers to one of said second compressed air source or said atmosphere.

6. A transfer device according to claim 4, wherein said first and second piston-cylinder units define respective first and second retraction chambers therewithin, and said transfer device further comprises a second compressed air source of relatively higher pressure and a third directional control valve capable of selectively connecting said first and second retraction chambers to one of said second compressed air source or said atmosphere.

7. A transfer device according to claim 3, wherein said telescopic pipe comprises an external pipe having one end attached to said base part and an internal pipe positioned coaxially within said external pipe, said internal pipe having one end attached to said support structure, said external pipe having an opposite end guided along said internal pipe, a seal being positioned at said opposite end of said external pipe between said internal and external pipes for making said telescopic pipe gas tight.

8. A transfer device according to claim 7, further comprising:

external screw threads provided on said external pipe at said opposite end;

a nut having screw threads engagable with said external screw threads for positioning said nut at a location along said external pipe, said nut having an end face facing said transfer mechanism; and a stop surface mounted on said support structure between said transfer mechanism and said nut, said stop surface facing and being engagable with said end face to define said outer end position of said transfer mechanism.

9. A transfer device according to claim 1, further comprising:

at least one feeder nozzle positioned to direct a stream of compressed air at said glass object on said dead plate to move said glass object toward said transfer mechanism; and a third directional control valve capable of selectively connecting said feeder nozzle to said first compressed air source.

10. A transfer device according to claim 3, further comprising:

at least one feeder nozzle positioned to direct a stream of compressed air at said glass object on said dead plate to move said glass object toward said transfer mechanism; and a second directional control valve capable of selectively connecting said feeder nozzle to said first compressed air source.

11. A transfer device according to claim 9, wherein said feeder nozzle is positioned to direct said stream of compressed air tangentially across a side of the glass object facing said pushing finger.

12. A transfer device according to claim 10, wherein said feeder nozzle is positioned to direct said stream of compressed air tangentially across a side of the glass object facing said pushing finger.

13. A transfer device according to claim 1, wherein each of said first and second directional control valves has a respective output line positioned between said control valve and one of said advance chambers, each of said output lines having a respective adjustable restrictor valve positioned therein.

14. A transfer device according to claim 2, wherein each of said first and second directional control valves has a respective output line positioned between said control valve and one of said advance chambers and said third directional control valve has an output line positioned between said third control valve and said retraction chambers, each of said output lines having a respective adjustable restrictor valve positioned therein.

15. A transfer device according to claim 3, wherein said first directional control valve has an output line positioned between said control valve and said inlet of said gas-tight telescopic pipe, said output line having an adjustable restrictor valve positioned therein.

16. A transfer device according to claim 4, wherein said first directional control valve has an output line positioned between said first control valve and said inlet of said gas-tight telescopic pipe and said second directional control valve has an output line between said second control valve and said advance chambers, each of said output lines having a respective adjustable restrictor valve positioned therein.

17. A transfer device according to claim 5, wherein said first directional control valve has an output line positioned between said control valve and said inlet of said gas-tight telescopic pipe and said second directional control valve has an output line positioned between said second directional control valve and said first and second retraction chambers, each of said output lines having a respective adjustable restrictor valve positioned therein.

18. A method of operating the transfer device according to claim 2 to transfer said at least one glass object from said dead plate of said glassware forming machine to said associated conveyor belt, said method comprising the steps of:

advancing said transfer mechanism from said inner starting position to said outer end position and proximate to said glass object on said dead plate by actuating said second directional control valve to supply compressed air to said second advance chamber;

connecting said retraction chambers to the atmosphere by actuating said third directional control valve;

supplying compressed air to said nozzle on said transfer mechanism by actuating said first directional control valve to direct said compressed air stream between said base part and said glass object thereby drawing said glass object into said corner of said transfer mechanism;

pivoting said first and second piston-cylinder units from said take-up position on said dead plate toward said transfer position on said conveyor belt thereby transferring said glass object onto said conveyor belt;

interrupting said supply of compressed air to said nozzle on said transfer mechanism by actuating said first directional control valve;

connecting said second advance chamber to the atmosphere by actuating said second directional control valve;

retracting said transfer mechanism from said outer end position to said inner starting position by actuating said third directional control valve to supply compressed air to said retraction chambers, said glass object remaining on said conveyor belt; and pivoting said first and second piston cylinder units to move said transfer mechanism from said transfer position on said conveyor belt to said take-up position on said dead plate.

19. A method of operating the transfer device according to claim 6 to transfer said at least one glass object from said dead plate of said glassware forming machine to said associated conveyor belt, said method comprising the steps of:

advancing said transfer mechanism from said inner starting position to said outer end position and proximate to said glass object on said dead plate by actuating said second directional control valve to supply compressed air to said first and second advance chambers;

connecting said retraction chambers to the atmosphere by actuating said third directional control valve;

supplying compressed air to said nozzle on said transfer mechanism by actuating said first directional control valve to direct said compressed air stream between said base part and said glass object thereby drawing said glass object into said corner of said transfer mechanism;

pivoting said first and second piston-cylinder units from said take-up position on said dead plate toward said transfer position on said conveyor belt thereby transferring said glass object onto said conveyor belt;

interrupting said supply of compressed air to said nozzle on said transfer mechanism by actuating said first directional control valve;

connecting said advance chambers to the atmosphere by actuating said second directional control valve;

retracting said transfer mechanism from said outer end position to said inner starting position by actuating said third directional control valve to supply compressed air to said retraction chambers, said glass object remaining on said conveyor belt; and pivoting said first and second piston cylinder units from said transfer position on said conveyor belt to said take-up position on said dead plate.

20. A method of operating the transfer device according to claim 9 to transfer said at least one glass object from said dead plate of said glassware forming machine to said associated conveyor belt, said method comprising the steps of:

advancing said transfer mechanism from said inner starting position to said outer end position and proximate to said glass object on said dead plate by actuating said second directional control valve to supply compressed air to said second advance chamber;

supplying compressed air to said nozzle on said transfer mechanism by actuating said first directional control valve to direct said compressed air stream between said base part and said glass object thereby drawing said glass object into said corner of said transfer mechanism;

pivoting said first and second piston-cylinder units from said take-up position on said dead plate toward said transfer position on said conveyor belt thereby transferring said glass object onto said conveyor belt;

interrupting said supply of compressed air to said nozzle on said transfer mechanism by actuating said first directional control valve;

connecting said second advance chamber to the atmosphere by actuating said second directional control valve;

retracting said transfer mechanism from said outer end position to said inner starting position by actuating said third directional control valve to supply compressed air to said retraction chambers, said glass object remaining on said conveyor belt; and pivoting said first and second piston cylinder units from said transfer position on said conveyor belt to said take-up position on said dead plate.

21. A method of operating the transfer device according to claim 20, further comprising the step of supplying compressed air to said feeder nozzle by actuating said third directional control valve to move the glass object into said corner of said transfer mechanism.

* * * * *